United States Patent [19]

Sagami et al.

[11] Patent Number: 5,085,754
[45] Date of Patent: Feb. 4, 1992

[54] CATION EXCHANGE MEMBRANE HAVING HIGH DURABILITY WITH DIFFUSION COATING ON MARGINAL AREAS OF THE MEMBRANE

[75] Inventors: Hiroshi Sagami; Hisashi Wakamatsu, both of Kanagawa, Japan

[73] Assignee: Asahi Kasei Kogyo Kabushiki Kaisha, Osaka, Japan

[21] Appl. No.: 548,608

[22] Filed: Jul. 5, 1990

[30] Foreign Application Priority Data

Jul. 7, 1989 [JP] Japan ................... 1-174168

[51] Int. Cl.$^5$ .................................... C25B 13/06
[52] U.S. Cl. ......................................... 204/296
[58] Field of Search ............... 504/295, 296; 521/27; 428/308.4, 315.9, 316.6, 328

[56] References Cited

U.S. PATENT DOCUMENTS

| | | | |
|---|---|---|---|
| 4,108,742 | 8/1978 | Seko et al. | 204/98 |
| 4,111,779 | 9/1978 | Seko et al. | 204/255 |
| 4,402,806 | 9/1983 | Coker et al. | 204/296 |
| 4,894,128 | 1/1990 | Beaver | 204/296 |

FOREIGN PATENT DOCUMENTS

| | | | |
|---|---|---|---|
| 52-144399 | 12/1977 | Japan. | |
| 54-71780 | 6/1979 | Japan. | |
| 0092416 | 6/1983 | Japan | 521/27 |
| 63-118082 | 5/1988 | Japan. | |

*Primary Examiner*—John Niebling
*Assistant Examiner*—Kathryn Gorgos
*Attorney, Agent, or Firm*—Birch, Stewart, Kolasch & Birch

[57] ABSTRACT

A cation exchange membrane having having durability, which is adapted for use in electrolysis or an alkali metal chloride, which comprises a quadrilateral base membrane and, disposed on at least one marginal area of one surface of the base membrane, a diffusion coating having a capability for an alkali metal hydroxide to diffuse therethrough at a diffusion velocity greater than that at which the alkali metal hydroxide diffuses through a fluorocarbon polymer layer constituting the base membrane when the base membrane is composed of one fluorocarbon polymer layer or through one outermost layer of the base membrane which layer has thereon the diffusion coating and has a water sorption smaller than that of the opposite outermost layer of the base membrane, when the base membrane is composed of a plurality of fluorocarbon polymer layers. The cation exchange membrane is free, for a prolonged period of time, from the local lowering of the mechanical strength of the membrane as caused by the precipitation of an alkali metal chloride within and the formation of oxygen in nascent state within the base membrane during the electrolysis of an alkali metal chloride.

10 Claims, 2 Drawing Sheets

CATION EXCHANGE MEMBRANE HAVING HIGH DURABILITY WITH DIFFUSION COATING ON MARGINAL AREAS OF THE MEMBRANE

BACKGROUND OF THE INVENTION

1. Field Of The Invention

The present invention relates to a cation exchange membrane having high durability. More particularly, the present invention is concerned with a cation exchange membrane for use in electrolysis of an alkali metal chloride, which comprises a quadrilateral base membrane and, disposed on at least one marginal area of one surface of the base membrane, a diffusion coating having a capability for an alkali metal hydroxide to diffuse therethrough at a diffusion velocity greater than that at which the alkali metal hydroxide diffuses through a fluorocarbon polymer layer constituting the base membrane when the base membrane is composed of one fluorocarbon polymer layer or through one outermost layer of the base membrane which layer has thereon the diffusion coating and has a water sorption smaller than that of the opposite outermost layer of the base membrane, when the base membrane is composed of a plurality of fluorocarbon polymer layers.

The cation exchange membrane of the present invention is free, for a prolonged period of time, from the local lowering of the mechanical strength of the membrane and the local damaging of the membrane attributed thereto, which are caused by the precipitation of an alkali metal chloride within and the formation of oxygen in nascent state within the base membrane during the electrolysis of an alkali metal chloride as described later. By the use of the cation exchange membrane of the present invention, an alkali metal chloride can be stably electrolyzed for a prolonged period of time.

2. Discussion of Related Art

It is generally desired for a cation exchange membrane that is to be used in the electrolysis of an alkali metal chloride to exhibit a high current efficiency and a low electric resistance and have an excellent mechanical strength.

The electrolysis of an alkali metal chloride is performed in a cation exchange membrane-containing electrolytic cell, the most popular of which is a filter press-type electrolytic cell having a quadrilateral shape in vertical cross-section. The filter press-type electrolytic cell comprises a number of unit cells each comprising a unit cell frame, an anode, an anode compartment, a cathode, a cathode compartment and a cation exchange membrane situated to separate the two compartments and fastened through gasket frames between the unit cell frames. With respect to the detailed structure of the filter press-type electrolytic cell, reference is made to, for example, U.S. Pat. Nos. 108,742 and 4,111,779.

BRIEF DESCRIPTION OF THE DRAWINGS in the accompanying drawings:

FIG. 1 shows a diagrammatic cross-sectional view of a part of an upper portion of a set of two unit cells of a filter press-type electrolytic cell for use in the electrolysis of an alkali metal chloride; and FIGS. 2 to 7 are diagrammatic plan views showing various forms of the cation exchange membrane according to the present invention.

When the electrolysis of an alkali metal chloride is performed in such a filter press-type electrolytic cell for a prolonged period of time, a cation exchange membrane having a quadrilateral shape is likely to suffer from a serious lowering of mechanical strength at marginal areas extending adjacent to and along the four sides of the quadrilateral cation exchange membrane, especially at a marginal area extending adjacent to and along a side of the quadrilateral cation exchange membrane which side is positioned in an upper portion of the electrolytic cell (see, for example, a collective area designated by characters A and B in FIG. 1. FIG. 1 shows a diagrammatic cross-sectional view of a part of an upper portion of a set of two unit cells, in which quadrilateral cation exchange membrane 3 is fastened through gasket frames 2, 2 between unit cell frames 1, 1. In FIG. 1, the collective area designated by characters A and B is a marginal area positioned adjacent to and along the upper side of the quadrilateral cation exchange membrane). Such a local lowering of mechanical strength will result in the damaging of the cation exchange membrane and the damaging of the electrolytic cell. If the damaging of the cation exchange membrane and/or the damaging of the electrolytic cell occurs, it is necessary to halt the operation of electrolysis. To avoid the damaging of the cation exchange membrane and the electrolytic cell, it is necessary to replace the cation exchange membrane by a fresh one within a relatively short period of time. The frequent replacement of a cation exchange membrane is disadvantageous from the viewpoints of productivity and cost.

The reasons for such a local lowering of mechanical strength and final damaging of the cation exchange membrane are believed to be as follows. The chlorine gas ($Cl_2$) generated in the anode compartment during the electrolysis of an alkali metal chloride is likely to be entrapped by and reside at marginal areas extending adjacent to and along the four sides of the quadrilateral cation exchange membrane, especially at a marginal area extending adjacent to and along a side of the quadrilateral cation exchange membrane which side is positioned in an upper portion of the electrolytic cell (see, for example, a collective area designated by characters A and B in FIG. 1. Character A indicates a portion of cation exchange membrane 3 sandwiched between portions of gasket frames 2, 2 which portion is free from the pressure of unit cell frames 1, 1 and is likely to be exposed to an electrolyte in an electrolytic cell, and character B indicates a portion of the current flowing area of cation exchange membrane 3 which portion has a width, as measured from the inner periphery of gasket frame 2, of about 10 mm or less). The reason for the chlorine gas likely to be entrapped by and reside at such marginal areas has not yet been elucidated. It is presumed, however, that the entrapping and residence of the chlorine gas would occur due to the presence of a step (as indicated by character S in FIG. 1) formed by the anode-side surface of the cation exchange membrane and the angular end portion of each gasket frame and to the presence of the surface irregularities of the gasket frame and the cation exchange membrane. The entrapped and residing chlorine gas diffuses into the cation exchange membrane. On the other hand, an alkali metal hydroxide (MOH) diffuses into the cation exchange membrane from the cathode side thereof. Inside the cation exchange membrane, the chlorine gas contacts the alkali metal hydroxide. As a result, the following reactions occur within the cation exchange membrane:

$$Cl_2 + 2MOH \rightarrow MCl + MClO + H_2O$$

$$2MClO \rightarrow 2MCl + O_2$$

wherein M represents an alkali metal.

An alkali metal chloride (MCl) having less solubility in water is formed and precipitated within the cation exchange membrane. Further, oxygen in nascent state is generated in the cation exchange membrane. It is believed that the precipitation of the alkali metal chloride and the generation of the oxygen in nascent state would damage the structure of the cation exchange membrane to thereby cause the above-mentioned local lowering of the mechanical strength and the final damaging of the cation exchange membrane.

As measures for preventing the local lowering of the mechanical strength of the cation exchange membrane, it has been proposed to employ a method in which a gas impermeable coating is disposed on marginal areas of one or both surfaces of a cation exchange membrane (see Japanese Patent Application Laid-Open Specification Nos. 52-144399 and 54-71780). Further, it has been proposed to employ a method in which a porous, alkali metal hydroxide-impermeable fluorocarbon resin film is laminated onto marginal areas of one surface of a cation exchange membrane, which surface faces the cathode during the electrolysis in an electrolytic cell, while a porous polymer film having a gas release surface layer, the inner portion of which is porous and hydrophilic, is optionally laminated onto marginal areas of the opposite surface of the cation exchange membrane, which opposite surface faces the anode during the electrolysis in the electrolytic cell (see Japanese Patent Application Laid-Open Specification No. 63-118082). In the above-mentioned proposals, it is requisite to apply heat and pressure at the time of laminating a film to marginal areas of one or both surfaces of the cation exchange membrane. Such an application of heat and pressure is disadvantageous from the viewpoint of productivity. In particular, such an application of heat and pressure is likely to cause the cation exchange membrane to suffer from a dimensional change, whereby it is difficult to obtain a flat cation exchange membrane. Assembly of a cation exchange membrane suffering from such a dimensional change into a large-size electrolytic cell is not easy, and the electrolytic cell comprising such a cation exchange membrane is likely to suffer from leakage of an electrolyte from the cell. Moreover, in the methods of the prior art, the bonding strength between the cation exchange membrane and the film laminated thereon by heating under pressure is insufficient, and hence, the laminated film is likely to be detached from the ion exchange membrane during the electrolysis of an alkali metal chloride.

Therefore, there has been a strong demand in the art for a cation exchange membrane for use in the electrolysis of an alkali metal chloride, which is free from the above-mentioned drawbacks of the prior art.

SUMMARY OF THE INVENTION

The present inventors have made extensive and intensive studies to develop measures for preventing the above-mentioned local lowering of the mechanical strength of a cation exchange membrane which is attributed to the precipitation of an alkali metal chloride and the formation of oxygen in nascent state due to the reaction of a chlorine gas with an alkali metal hydroxide within the ion exchange membrane. As a result, it has unexpectedly been found that the local lowering of the mechanical strength of the cation exchange membrane can be effectively avoided by applying to at least one marginal area of four marginal areas respectively extending adjacent to and along the four sides of one surface of the cation exchange base membrane, which surface is adapted to face the cathode in an electrolytic cell, a diffusion coating having a capability for an alkali metal hydroxide to diffuse therethrough at a diffusion velocity greater than that at which the alkali metal hydroxide diffuses through a fluorocarbon polymer layer constituting the base membrane when the base membrane is composed of one fluorocarbon polymer layer or through one outermost layer of the base membrane, which outermost layer has thereon the diffusion coating and has a water sorption smaller than that of the opposite outermost layer of the base membrane when the base membrane is composed of a plurality of fluorocarbon polymer layers. The resolution of the problem of the local lowering of the mechanical strength of the cation exchange membrane by the application of a diffusion coating having a greater diffusion velocity as mentioned above is unexpected because the efforts of the prior art contrarily have been directed to the prevention of the diffusion of an alkali metal hydroxide into the cation exchange membrane at the marginal areas thereof. The present invention is based on this unexpected finding.

Accordingly, it is an object of the present invention to provide a cation exchange membrane for use in the electrolysis of an alkali metal chloride, which membrane is free, for a prolonged period of time, from the local lowering of mechanical strength and final damaging of the cation exchange membrane, that is, free from occurrence of the precipitation of an alkali metal chloride and the formation of oxygen in nascent state due to the reaction of a chlorine gas with an alkali metal hydroxide within the cation exchange membrane.

The foregoing and other objects, features and advantages of the present invention will be apparent from the following detailed description and appended claims taken in connection with the accompanying drawings.

DETAILED DESCRIPTION OF THE INVENTION

Figure 1:
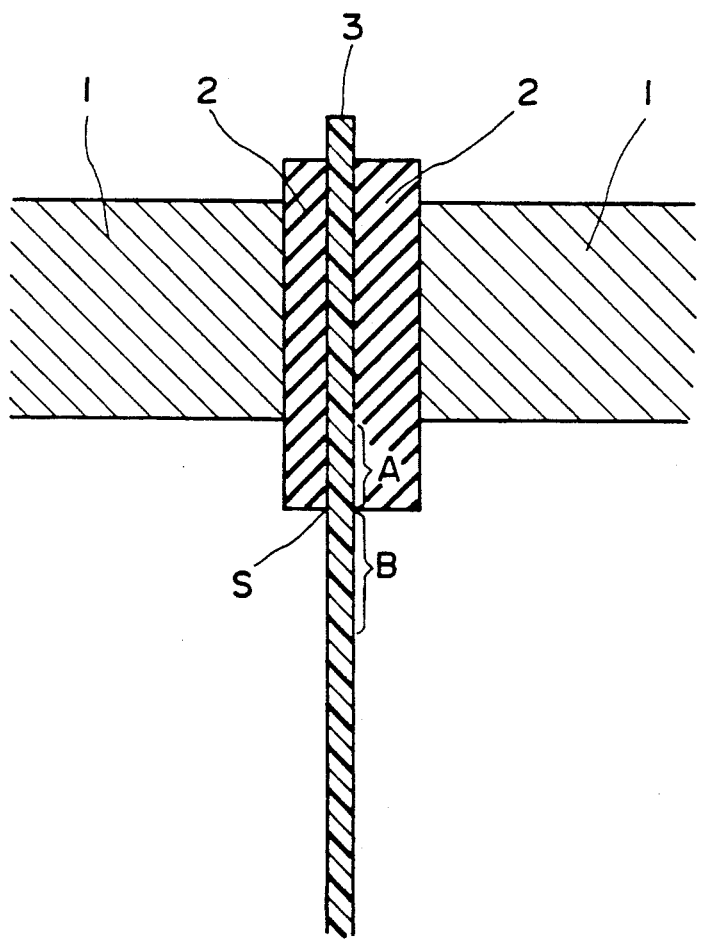

In accordance with the present invention, there is provided a cation exchange membrane for use in electrolysis of an alkali metal chloride, comprising:

a quadrilateral base membrane comprising at least one layer of a cation exchange groups-containing fluorocarbon polymer and having both surfaces each having four marginal areas respectively extending adjacent to and along four sides of the quadrilateral base membrane, and a diffusion coating disposed on at least one marginal area of the four marginal areas of one surface of the base membrane, wherein when the base membrane is composed of one fluorocarbon polymer layer, the diffusion coating has a capability for an alkali metal hydroxide formed by electrolysis of an alkali metal chloride to diffuse therethrough at a diffusion velocity greater than that at which the alkali metal hydroxide diffuses through the fluorocarbon polymer layer, and when the base membrane is composed of a plurality of fluorocarbon polymer layers, the one surface of the base membrane is comprised of a surface of a first outermost layer of the base membrane which layer has a water sorption smaller than that of an opposite, second outermost layer of the base membrane and the diffusion coating has a capability for the alkali metal hydroxide to diffuse therethrough at a diffusion velocity greater than that at which the alkali metal hydroxide diffuses through the first outermost layer.

The reason why the local lowering of the mechanical strength of the cation exchange membrane does not occur when the above-defined diffusion coating is disposed on at least one marginal area of four marginal areas of one surface of the base membrane has not yet been elucidated. It is, however, believed to be as follows. The diffusion velocity of an alkali metal hydroxide within a cation exchange membrane would be increased by the high diffusion in the diffusion coating which is in contact with a catholyte in a cathode compartment, and due to the increased diffusion, the site of the reaction between a chlorine gas and an alkali metal hydroxide would be transferred to the anode compartment outside the membrane, rather than inside the membrane, thereby avoiding the precipitation of an alkali metal chloride within and the generation of oxygen in nascent state within the membrane.

As a base membrane for use in the cation exchange membrane of the present invention, any of conventional cation exchange membranes made of a fluorocarbon polymer containing sulfonate groups and/or carboxylate groups as cation exchange groups, can be used. The cation exchange groups-containing fluorocarbon polymer is obtained by hydrolyzing a fluorocarbon polymer comprising a main chain of a fluorocarbon and having a side chain containing sulfonyl groups and/or carboxyl groups in melt-fabricable form.

The method for producing the cation exchange groups-containing fluorocarbon polymer is not specifically limited, and with respect to the method for producing the fluorocarbon polymer, reference may be made to, for example, U.S. Pat. Nos. 4,536,352, 4,131,740 and 3,282,875. Illustratively stated, the fluorocarbon polymer can be produced by copolymerizing at least one monomer selected from the following first group of monomers and at least one monomer selected from the following second and third groups of monomers.

Examples of monomers of the first group include a fluorinated vinyl compound, such as vinyl fluoride, hexafluoropropylene, vinylidene fluoride, a perfluoroalkylvinyl ether and tetrafluoroethylene.

The monomer of the second group is a vinyl compound having a functional group capable of being converted into a carboxylic acid-type ion exchange group. Generally, a monomer represented by the following formula can be used:

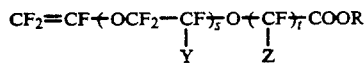

wherein s is an integer of from 0 to 2, t is an integer of from 1 to 12, Y and Z each independently represent a fluorine atom or a trifluoromethyl group, and R represents a n-alkyl group having 1 to 4 carbon atoms.

Representative examples of monomers of the second group include:
$CF_2=CFOCF_2CF(CF_3)O(CF_2)_2COOCH_3$,
$CF_2=CFO(CF_2)_2COOCH_3$,
$CF_2=CFO(CF_3)_3COOCH_3$, and the like.

The monomer of the third group is a vinyl compound having a functional group capable of being converted into a sulfonic acid-type ion exchange group. The vinyl compound can be represented, for example, by the formula:

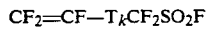

wherein T represents a bifunctional fluorocarbon group having 1 to 8 carbon atoms, and k is 0 or 1.

The bifunctional fluorocarbon group represented by T may be either in the form of a straight chain or in the form of a branched chain. Further, group T may contain at least one ether linkage. When k is 1, it is preferred that a vinyl group be bonded to group T through an ether linkage. That is, a preferred monomer may be represented by the formula:

$CF_2=CFOTCF_2SO_2F$ wherein T is as defined above.

Preferred examples of monomers of the third group include:
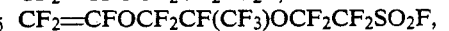

The types and amounts of the monomers selected from the above-mentioned three groups, which are subjected to copolymerization, are appropriately selected according to the desired type and amount of the functional group of a final fluorocarbon polymer. For example, when it is intended to produce a polymer having only a carboxylate group as a functional group, such a polymer can be produced by copolymerizing at least one monomer of the first group and at least one monomer of the second group. The amount of each monomer is varied depending upon the desired amount of the functional group per unit weight of a polymer. When it is intended to increase the amount of the functional group, the amount of at least one monomer selected from the second and third groups is increased. The amount of the functional group is generally in the range of from 0.5 to 2.0 milliequivalents/g, preferably from 0.6 to 1.5 milliequivalents/g of the polymer, in terms of ion exchange capacity as measured after all the functional groups have been converted into ion exchange groups.

It is preferred that the base membrane be composed of a plurality of fluorocarbon polymer layers from the viewpoint of reduction of electric power consumption. When a cation exchange membrane comprising a plurality of fluorocarbon polymer layers is used for electrolysis, the membrane is generally set in an electrolytic cell in a manner such that the surface of a first outermost layer, which is defined as the one having a water sorption smaller than that of the other outermost layer (which is hereinafter, frequently referred to as the "opposite, second outermost layer"), faces the cathode in the electrolytic cell.

The above-mentioned water sorption is determined by the customary weight-drying method as follows.

A sample membrane is immersed in a 10N NaOH solution at 90° C. for 20 hours so that the membrane sufficiently absorbs the solution. Then, the membrane is taken out of the solution and weighed (W₁). Thereafter, the membrane is dried at 90° C. in vacuum, while the completeness of drying is checked by measuring the infrared spectra of the membrane. The resultant completely dried membrane is weighed ($W_2$). Then, the NaOH is removed from the membrane by Donnan exclusion, and dried at 90° C. in vacuum while the completeness of drying is checked by measuring the infrared spectra of the membrane is weighed ($W_3$). The water sorption (%) is calculated by formula: $(W_1-W_2)/W_3 \times 100$.

With respect to the ion exchange groups-containing fluorocarbon polymer, it is known that the larger the ion exchange capacity, the higher the water sorption becomes when the polymer has a single type of an ion exchange group. Further, it is also known that the larger the length of the chain structure of the polymer, or the higher the acidity of the ion exchange groups contained in the polymer, the higher the water sorption of the polymer becomes when the ion exchange capacity is the same. Taking the above relationships into consideration, a cation exchange membrane is appropriately designed.

The cation exchange membrane of the present invention may further comprise a reinforcing fabric. As a representative example of the reinforcing fabric, there can be mentioned a woven fabric comprising warps and wefts of reinforcing yarns of a monofilament or a multifilament made of a fluoropolymer. If desired, the woven fabric may further comprise sacrificial yarns of a monofilament or a multifilament made of a hydrocarbon. With respect to the reinforcing fabric, reference may be made to, for example, U.S. Pat. Nos. 4,072,793 and 4,437,951.

From the standpoint of desired mechanical strength, it is most preferred that the cation exchange membrane of the present invention comprise the above-mentioned cation groups-containing fluorocarbon polymer and the reinforcing fabric.

As a material for the diffusion coating to be disposed on at least one marginal area of the four marginal areas of one surface of the base membrane, a fluorocarbon polymer having a high water sorption and a mixture of a fluorocarbon polymer and inorganic particles may preferably be used.

The above-mentioned fluorocarbon polymer having a high water sorption is, for example, a fluorocarbon polymer having sulfonate groups and/or carboxylate groups.

Examples of such fluorocarbon polymers include copolymers as obtained by hydrolyzing a copolymer of

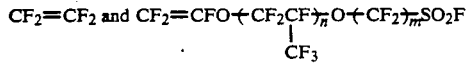

(wherein n is an integer of from 0 to 2 and m is an integer of from 1 to 3) or a copolymer of $-CF_2=CF_2$ and

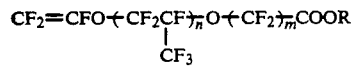

(wherein n is an integer of from 0 to 2, m is an integer of from 1 to 3, and R represents $-CH_3$, $C_2H_5$ or $-C_3H_7$).

The diffusion coating to be disposed according to the present invention may preferably have a water sorption of 1 to 12%, more preferably 3 to 7%, higher than that of a fluorocarbon polymer layer constituting the base membrane when the base membrane is composed of one fluorocarbon polymer layer or higher than that of the first outermost layer when the base membrane is composed of a plurality of fluorocarbon polymer layers.

Representative examples of inorganic particles which can be incorporated in the diffusion coating include oxides of zirconium, silicon and titanium, nitrides of zirconium, silicon and titanium, and carbonates of zirconium, silicon and titanium. The above-mentioned inorganic particles preferably have a particle diameter of from 0.01 to 0.20 μm, more preferably from 0.02 to 0.08 μm.

The fluorocarbon polymer content of the mixture of inorganic particles and a fluorocarbon polymer for use as the diffusion coating is preferably in the range of from 5 to 70 wt. %. The mixture may be porous and have a porosity of at least 15%, as measured by means of a mercury porosimeter.

In the present invention, the diffusion coating has a capability for an alkali metal hydroxide to be diffused therethrough at a diffusion velocity greater than that at which the alkali metal hydroxide diffuses through a fluorocarbon polymer layer constituting the base membrane when the base membrane is composed of one fluorocarbon polymer layer or through the first outermost layer of the base membrane when the base membrane is composed of a plurality of fluorocarbon polymer layers. The diffusion velocity of an alkali metal hydroxide through the fluorocarbon polymer layer or through the first outermost layer is not critical. It is, however, generally in the range of from 20 to 30 meq./dm²·hr. The diffusion velocity through the diffusion coating is preferably at least 5 times as high as the diffusion velocity through a fluorocarbon polymer layer constituting the base membrane or through the first outermost layer of the base membrane.

The diffusion velocity as used herein is determined as follows.

With respect to each of a fluorocarbon polymer layer constituting the base membrane or a first outermost most fluorocarbon polymer layer of the base membrane and a diffusion coating not containing inorganic particles, a sample membrane having a thickness of 25 μm and a predetermined surface area is prepared. The sample membrane has the same composition as that of the fluorocarbon polymer layer or the diffusion coating. Each sample membrane is individually disposed in an electrolytic cell comprising an anode compartment and a cathode compartment in a fashion such that the sample membrane separates the two compartments, and then, 3.5N NaCl and 30% NaOH are charged into the anode compartment and the cathode compartment, respectively. The electrolytic cell is allowed to stand at 90° C. for 3 hours (without passing electric current), and then, the amount of NaOH, per dm² of the sample membrane, which has passed through the sample membrane having a thickness of 25 μm is measured by an acid-alkali titration. From the measured amount of NaOH, the diffusion velocity is determined, in terms of meq./dm2.hr. With respect to a diffusion coating containing inorganic particles, the diffusion velocity of an alkali metal hydroxide is determined as follows. Sample coating (a) of 0.5 mg/cm² containing inorganic particles is applied to the surface of a membrane filter having a pore diameter of 3 μm, and the diffusion velocity ($d_1$) of the resultant composite membrane filter is determined in the same manner as mentioned above. Further, reference coating (b) of 0.5 mg/cm$^2$ comprising a polymer having sulfonate groups, which coating has a diffusion velocity of known value (d$_2$), is applied to the surface of a membrane filter having a pore diameter of 3 μm, and the diffusion velocity (d$_3$) of the resultant composite membrane filter is determined in the same manner as mentioned above. From the ratio of the diffusion velocity of sample coating (a) to that of reference coating (b), the diffusion velocity (D) of the diffusion coating containing inorganic particles is determined by formula:

$$D = d_2 \times \frac{d_1}{d_3}.$$

In the present invention, when the cation exchange membrane is composed of a plurality of fluorocarbon polymer layers, the first outermost layer faces a cathode in an electrolytic cell, and on the other hand, the opposite, second outermost layer of the base membrane, which layer has a water sorption larger than that of the first outermost layer of the base membrane, faces an anode in the electrolytic cell.

In addition to the diffusion coating, the cation exchange membrane of the present invention may further have a hydrophilic coating comprising inorganic particles, which is disposed on a surface of the opposite, second outermost layer at an area corresponding to the at least one marginal area having the diffusion coating thereon. By the hydrophilic coating, the local lowering of the mechanical strength of the membrane can be more effectively prevented.

The reason for the more effective prevention of the local lowering of the mechanical strength of the membrane has not yet been elucidated. It is, however, believed to be as follows.

The hydrophilic coating would increase the water sorption of the base membrane, i.e., the amount of water present in the base membrane, thereby preventing an alkali metal chloride from precipitation within the base membrane. Moreover, advantageously, the hydrophilic coating would alleviate the entrapping and residence of a chlorine gas.

The hydrophilic coating preferably comprises a liquid- and gas-permeable, porous layer comprising inorganic particles and a fluorocarbon polymer having a high water sorption, or comprising inorganic particles and a fluorocarbon polymer, such as polytetrafluoroethylene. It is preferred that the hydrophilic coating have a porosity of at least 15%. When only a fluorocarbon polymer having a high water sorption is used as a hydrophilic coating, the effectiveness of the hydrophilic coating cannot be brought about. Hence, inorganic particles are essential for the hydrophilic coating.

The inorganic materials and polymers to be used for forming the hydrophilic coating are the same as those used for forming the diffusion coating.

Figure 2:
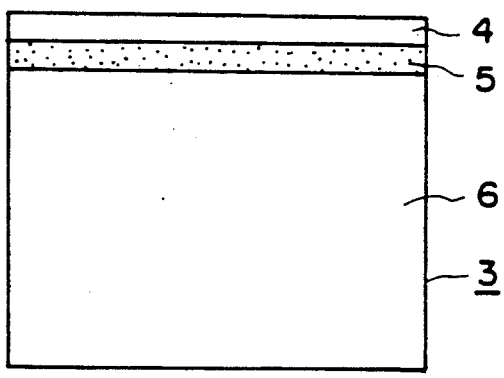
Figure 3:
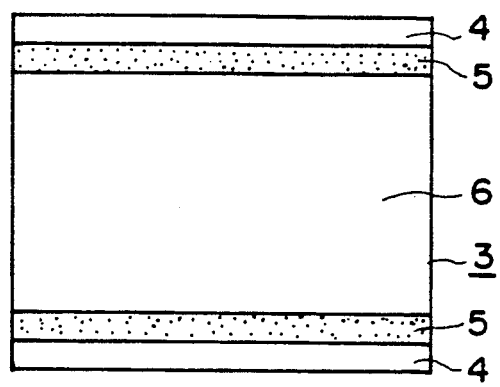

When the diffusion coating is formed on the entire surface of the membrane, the current efficiency becomes poor at the time of electrolysis. Therefore, the diffusion coating should not be formed on the entire surface of the membrane surface. Generally, the diffusion coating is formed on at least one marginal area of four marginal areas of one surface of the base membrane, which marginal area corresponds to a portion of the opposite surface of the membrane, in which portion a chlorine gas is likely to be entrapped and reside during the electrolysis when the cation exchange membrane is set in an electrolytic cell by fastening the marginal areas of the membrane through gasket frames between the unit cell frames of the electrolytic cell. Such a marginal area corresponding to a chlorine gas-entrapping portion of the opposite surface of the membrane includes a portion of the membrane sandwiched between lower portions of gasket frames, which portion is less susceptive to the fastening pressure of unit cell frames and is likely to be exposed to electrolytes in an electrolytic cell (which portion is indicated by character A in FIG. 1) and a portion extending over the membrane surface from a position corresponding to the inner peripheral edge of gasket frame downwardly to a small extent (which portion is indicated by character B in FIG. 1). For preventing the diffusion of a chlorine gas into the membrane, it is preferred that the width of the diffusion coating at portion B shown in FIG. 1 be at least 10 mm. Taking into consideration the width of gasket frames and any possible slippage between the gasket frames and the membrane when the membrane is set in an electrolytic cell, it is generally preferred that the diffusion coating be formed so that the width of the diffusion coating (total of the widths of portions A and B) is 20 to 300 mm. For preventing an upper portion of the cation exchange membrane from being damaged due to the entrapping and residence of a chlorine gas, it is requisite but sufficient to provide a diffusion coating so as to cover portions A and B of FIG. 1, when the membrane is set in an electrolytic cell. Accordingly, as shown in FIGS. 2 and 3, diffusion coating 5 may be provided on base membrane 3 in a manner such that portion 4 is left non-coated. However, for providing such a non-coated portion, a complicated coating operation is required. Therefore, for simplifying the coating operation, diffusion coating 7 may be provided on base membrane 3 in a manner such that a non-coated portion is not left in the edge portion of the cation exchange membrane, as shown in FIGS. 4 to 7.

Figure 4:
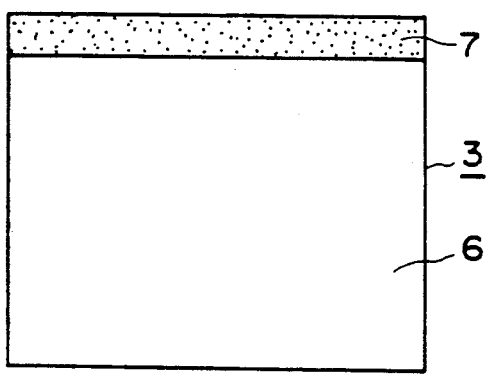
Figure 5:
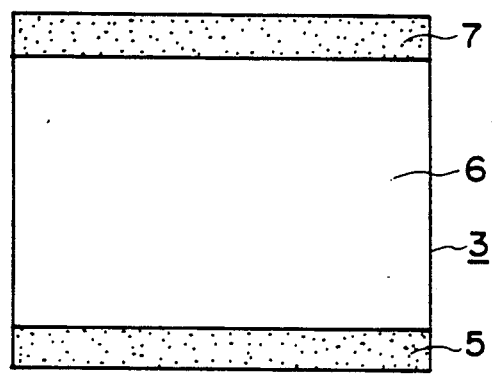
Figure 6:
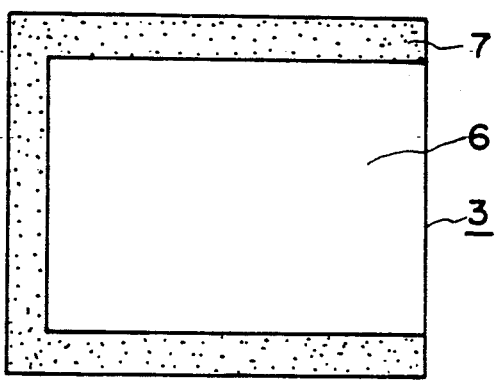
Figure 7:
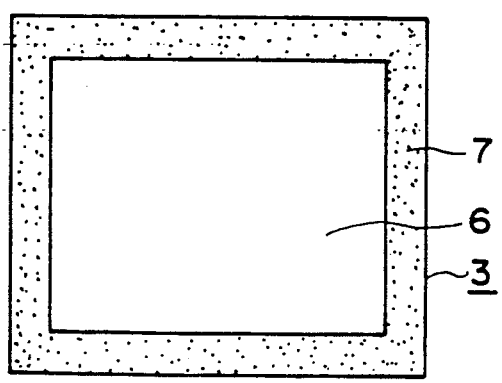

Referring to FIGS. 2 to 7, the diffusion coating may be formed on one marginal area (as shown in FIGS. 2 and 4), on opposite marginal areas (as shown in FIGS. 3 and 5), on three marginal areas (as shown in FIG. 6) or on four marginal areas (as shown in FIG. 7) of the surface of base membrane 3. From the viewpoint of the complete avoidance of the adverse effect of the chlorine gas, it is desirable that diffusion coating 7 be provided on three or four marginal areas, as shown in FIGS. 6 and 7. However, this causes the production of the cation exchange membrane to be time-consuming and costly, and likely to adversely affect current efficiency. Even in the case where diffusion coating 5 or 7 is provided only on one marginal area as shown in FIGS. 2 and 4, the objective of the present invention is well attained by disposing the cation exchange membrane in an electrolytic cell in a manner such that the marginal area is positioned at an upper portion of the electrolytic cell because the chlorine gas is likely to be entrapped and reside mainly at an upper portion of an electrolytic cell. Taking into account the balance of above advantages and disadvantages depending on the marginal area or areas where diffusion coating 5 or 7 is disposed, it is generally preferred that diffusion coating 5, 7 be disposed on opposite marginal areas of one surface of the base membrane as shown in FIGS. 3 and 5 so that the opposite marginal areas may be, respectively, positioned at the upper and lower portions of an electrolytic cell when the membrane is set in an electrolytic cell, because the second portion of the membrane at which a chlorine gas is likely to be entrapped and reside is a portion corresponding to a lower portion of the electrolytic cell.

From the viewpoint of the effective utilization of the membrane surface so as to minimize the loss of the current flowing area of the membrane, the total width of portion 4 and diffusion coating 5 in FIGS. 2 and 3 or width of diffusion coating 7 in FIGS. 4 to 7 is preferably not greater than about 300 mm, more preferably not greater than about 150 mm. Further, it is preferred that the area of portion 5 or 7 of FIGS. 2 to 7 of the membrane surface on which the coating is formed be not greater than 40%, preferably not greater than 20%, based on the area of the entire surface of the membrane. The amount of the coating is preferably in the range of from 0.05 to 10 mg/cm$^2$.

The area, width and amount of the hydrophilic coating are substantially the same as those of the diffusion coating, except that the hydrophilic coating is disposed on the opposite surface of the membrane.

The method for forming the diffusion coating on the surface of the base membrane is not specifically limited, and the following methods can generally be used.

Method (a): (in the case where the diffusion coating is comprised only of a fluorocarbon polymer):

A fluorocarbon polymer having a high water sorption is dissolved in an aqueous solution containing 20 wt. % or more of an alcoholic solvent, such as methanol and ethanol while heating, so that the fluorocarbon polymer content of the resultant solution becomes 1 to 20wt. %. Then, the resultant solution is coated on the above-mentioned surface of the base membrane by spraying, etc.

Method (b): (in the case where the diffusion coating is comprised of a fluorocarbon polymer and inorganic particles):

In the solution as prepared in Method (a) above, inorganic particles are uniformly dispersed by means of a ball mill, etc. In this case, the resultant disper-sion is then coated on the surface of the base membrane by spraying, rolling, etc.

Method (c): (in the case where the diffusion coating is comprised of a fluorocarbon polymer and inorganic particles):

A fluorocarbon polymer, such as polytetrafluoroethylene, is suspended in an aqueous solution of an alcohol, such as methanol and ethanol, to thereby obtain a suspension, and inorganic particles are dispersed in the suspension. The resultant dispersion is coated by spraying, rolling, screen printing, etc.

The hydrophilic coating can be applied by the same methods as described above with respect to the diffusion coating.

A precursor base membrane has side chains containing functional groups in a melt-fabricable form, and the functional groups as such do not have an ion exchange capability. Therefore, in using the membrane for producing an alkali metal hydroxide, it is necessary that the precursor base membrane having side chains containing functional groups in melt-fabricable form be hydrolyzed using an acid or alkali so that all of the functional groups are converted to ion exchange groups. The hydrolysis may be conducted after the formation of the diffusion coating or both the diffusion coating and the hydrophilic coating on the base membrane. Alternatively, the hydrolysis may be conducted before the formation of the diffusion coating or both the diffusion coating and the hydrophilic coating on the base membrane. In the latter case (hydrolysis conducted before the formation of the coating), it is necessary to dry the hydrolyzed membrane before the formation of the coating, whereas in the former case (hydrolysis conducted after the formation of the coating), such a drying process is not required. Therefore, from an economic standpoint in the production of the membrane on a commercial scale, it is preferred that the diffusion coating or both the diffusion coating and the hydrophilic coating be formed on a precursor ion exchange membrane before the precursor membrane is subjected to hydrolysis.

The cation exchange membrane of the present invention is set in an electrolytic cell as follows. When the cation exchange membrane as shown in FIGS. 2 or 4 is used, the cation exchange membrane is set in a manner such that the marginal area having diffusion coating 5 or 7 is positioned at the upper portion of the electrolytic cell. When the cation exchange membrane as shown in FIGS. 3, 5, 6 or 7 is used, the cation exchange membrane is set in a manner such that any one of marginal areas having diffusion coating 5 or 7 is positioned at the upper portion of the electrolytic cell.

The electrolysis of an alkali metal chloride using the cation exchange membrane of the present invention can be conducted under the same conditions as those used conventionally. That is, the electrolysis can be conducted at 50 to 100° C. and at a current density of 10 to 60 A/dm$^2$, using an aqueous alkali metal chloride solution having an alkali metal chloride concentration of 2.5 to 5N, which is charged into an anode compartment, and an aqueous alkali metal hydroxide solution having an alkali metal hydroxide concentration of 20 to 50% by weight, which is charged into a cathode compartment.

As apparent from the foregoing, the cation exchange membrane of the present invention is characterized by a diffusion coating disposed on at least one marginal area of one surface of a base membrane and having a capability for an alkali metal hydroxide to diffuse therethrough at a diffusion velocity greater than that at which the alkali metal hydroxide diffuses through a fluorocarbon polymer layer constituting the base membrane when the base membrane is composed of one fluorocarbon polymer layer or through one outermost layer of the base membrane which layer has thereon the diffusion coating and has a water sorption smaller than that of the opposite outermost layer of the base membrane, when the base membrane is composed of a plurality of fluorocarbon polymer layers. The cation exchange membrane of the present invention is set in an electrolytic cell so that the diffusion coating-having marginal area of one surface of the cation exchange membrane faces the cathode and positioned at a location corresponding to a portion of the opposite surface of the membrane in which portion a chlorine gas is likely to be entrapped and reside during the course of the electrolysis of an alkali metal chloride. When the electrolysis of an alkali metal chloride is conducted using such an electrolytic cell, the cation exchange membrane is free, for a prolonged period of time, from the local lowering of the mechanical strength of the membrane and the local damaging of the membrane attributed thereto, which are caused by the precipitation of an alkali metal chloride within and the formation of oxygen in nascent state within the base membrane during the electrolysis of an alkali metal chloride. By the use of the cation exchange membrane of the present invention, an alkali metal chloride can be electrolyzed stably for a prolonged period of time.

Hereinafter, the present invention will be described in more detail with reference to Examples and Comparative Examples, which should not be construed as limiting the scope of the present invention.

EXAMPLE 1

A copolymer of $CF_2=CF_2$ and $CF_2=CFOCF_2CF(CF_3)O(CF_2)_2COOCH_3$, having an equivalent weight of 1,150, is subjected to extrusion molding to obtain a film having a thickness of 25 μm (film A). On the other hand, a copolymer of $CF_2=CF_2$ and $CF_2=CFOCF_2CF(CF_3)O(CF_2)_3SO_2F$, having an equivalent weight of 1,050, is subjected to extrusion molding to obtain a film having a thickness of 100μm (film B). Film A, film B and a 50-mesh reinforcing plain woven fabric of polytetrafluoroethylene fibers of 100 denier are laid upon one another in this order, and pressed under heating, thereby obtaining a laminated sheet.

The thus obtained laminated sheet is subjected to hydrolysis and cut, thereby obtaining a cation exchange membrane having a quadrilateral shape of 1,270 mm × 2,455 mm. The diffusion velocity of sodium hydroxide through the layer of film A is 28 meq/dm$^2$·hr. The water sorptions of layers of A and B are 4% and 12%, respectively.

On the other hand, a copolymer of $Cf_2=CF_2$ and $CF_2=CFOCF_2CF(CF_3)O(CF_2)_3SO_2F$, having an equivalent weight of 1,000, is subjected to hydrolysis to covert it into an acid type. An amount of 200 g of the resultant copolymer is dissolved in a mixture of 4,500 g of ethanol and 4,500 g of water. In the resultant mixture, 800 grams of zirconium oxide is dispersed to obtain a diffusion coating composition. The diffusion velocity for the diffusion coating composition is measured as follows. The composition is coated on a membrane filter having a pore diameter of 3μm and dried, thereby obtaining a diffusion coating of 0.5 mg/cm$^2$. The diffusion velocity of sodium hydroxide through the diffusion coating is 1,350 meq/dm$^2$·hr.

The same diffusion coating composition as obtained above is coated, by spraying, on the four marginal areas (as shown in FIG. 7) of the outer surface of the layer of film A in an amount of 0.5 mg/cm$^2$ to provide a coating width of 125 mm from each of the edges of the laminated sheet. Then, the coating is dried. Thus, a membrane of a size of 1,270 mm × 2,455 mm, having a central non-coated surface area of a size of 1,020 mm × 2,205 mm, is obtained.

The thus obtained cation exchange membrane is set in a filter press-type electrolytic cell so as to provide a current flowing area of 1,154 mm × 2,354 mm in a manner such that the surface of Film A having the diffusion coating is disposed on the side of the cathode compartment. Electrolysis is conducted at 90° C. and at a current density of 40 A/dm$^2$ for 180 days while the sodium chloride concentration of the solution in the anode compartment is maintained at 3.5N and the sodium hydroxide concentration of the solution in the cathode compartment is maintained at 35% by weight.

After completion of the electrolysis, the membrane is taken out, and several cross sections of the membrane at a portion which corresponds to the upper portion of the electrolytic cell are visually examined. Neither the formation of crystals of sodium chloride nor a break in the membrane is observed. Further, the mechanical strength of the above-mentioned portion of the membrane is measured at the start-up of the electrolysis and after the electrolysis for 180 days. The results are shown below.

|  | At start-up | After 180 days |
|---|---|---|
| Tensile strength (kg/cm) | 6.5 | 6.0 |
| Tensile elongation (%) | 60 | 58 |

COMPARATIVE EXAMPLE 1

Substantially the same procedure as in Example 1 is repeated except that no diffusion coating is formed on the surface of the outer layer of film A, to thereby obtain a cation exchange membrane. Then, electrolysis is conducted using the membrane in the same manner as in Example 1.

After completion of the electrolysis, the membrane is removed. Then, several cross sections of the membrane at a portion corresponding to the upper portion of the electrolytic cell are visually examined. It is found that crystals of sodium chloride are formed at that portion. Washing is made to remove the sodium chloride, and thereafter it is found that at the portion of the membrane where the crystals of sodium chloride have been formed, there is a cavity and the tissue of the membrane is broken. The mechanical strength of the membrane is measured at the start-up of the electrolysis and after the electrolysis for 180 days. The results are shown below.

|  | At start-up | After 180 days |
|---|---|---|
| Tensile strength (kg/cm) | 7.0 | 4.5 |
| Tensile elongation (%) | 65 | 20 |

EXAMPLE 2

A copolymer of $CF_2=CF_2$ and $CF_2=CFOCF_2CF(CF_3)O(CF_2)_2COOCH_3$, having an equivalent weight of 1,200, is subjected to extrusion molding, thereby obtaining a film having a thickness of 25 μm (film A).

On the other hand, a copolymer of $CF_2=CF_2$ and $CF_2=CFOCF_2CF(CF_3)O(CF_2)_3SO_2F$, having an equivalent weight of 1,050, is subjected to extrusion molding, thereby obtaining a film having a thickness of 100 μm (film B).

Film A, film B and a reinforcing leno woven fabric of polytetrafluoroethylene fibers of 200 denier and polytetrafluoroethylene fibers of 400 denier are laid upon one another in this order, and pressed under heating, thereby obtaining a laminated sheet.

The thus obtained laminated sheet is subjected to hydrolysis and cut, thereby obtaining a cation exchange membrane having a quadrilateral shape of 1,270 mm × 2,455 mm. The diffusion velocity of sodium hydroxide through the layer of film A is 25 meq/dm$^2$·hr. The water sorptions of layers A and B are 3% and 12%, respectively.

On the other hand, a copolymer of $CF_2=CF_2$ and $CF_2=CFOCF_2CF(CF_3)O(CF_2)_3SO_2F$, having an equivalent weight of 1,000, is subjected to hydrolysis to covert it into an acid type. An amount of 200 g of the resultant copolymer is dissolved in a mixture of 4,500 g of ethanol and 4,500 g of water, thereby obtaining a diffusion coating composition. The diffusion velocity for the diffusion coating composition is measured as follows. The composition is coated on a membrane filter having a pore diameter of 3 μm and dried, thereby obtaining a diffusion coating of 0.1 mg/cm$^2$. The diffusion velocity of sodium hydroxide through the diffusion coating is 1,700 meq/dm$^2$·hr. The water sorption of the diffusion coating is 14%.

The same diffusion coating composition as obtained above is coated on four marginal areas of the laminated sheet in the same manner as in Example 1, except that the coating is formed by the roll method in an amount of 0.1 mg/cm$^2$, to thereby obtain a cation exchange membrane.

Using the above-obtained cation exchange membrane, electrolysis is conducted for 250 days under the same conditions as in Example 1.

After completion of the electrolysis, the membrane is removed, and several cross sections of the membrane at a portion corresponding to the upper portion of the electrolytic cell are visually examined. Neither the formation of crystals of sodium chloride nor a break in the membrane is observed. The mechanical strength of the above-mentioned membrane is measured at the start-up of the electrolysis and after the electrolysis for 250 days. The results are shown below.

|  | At start-up | After 250 days |
| --- | --- | --- |
| Tensile strength (kg/cm) | 7.5 | 7.3 |
| Tensile elongation (%) | 70 | 67 |

EXAMPLE 3

A copolymer (A) of $CF_2=CF_2$ and $CF_2=CFOCF_2CF(CF_3)O(CF_2)_2COOCH_3$, having an equivalent weight of 1,100 and a copolymer (B) of $CF_2=CF_2$ and $CF_2=CFOCF_2CF(CF_3)O(CF_2)_2SO_2F$, having an equivalent weight of 1,030, are subjected to co-extrusion, thereby obtaining film C having a thickness of 115 μm consisting of a copolymer A layer having a thickness of 25 μm and a copolymer B layer having a thickness of 90 μm. Separately, copolymer B is extrusion-molded to prepare film D having a thickness of 40 μm. A 20-mesh reinforcing plain woven fabric of polytetrafluoroethylene fibers of 200 denier is sandwiched between the above-obtained film C and film D in a manner such that the copolymer B side of film C faces the plain woven fabric, thereby preparing a laminated sheet. The above procedure is repeated twice to prepare two laminated sheets. The surface of the above-obtained laminated sheet on the side of the copolymer A layer is designated Surface A and, the surface of the laminated sheet on the side of the copolymer B layer is designated Surface B.

Polymer B is converted to acid form by hydrolysis. 200 g of the resultant acid form polymer is dissolved in a mixture of 4,500 g of ethanol and 4,500 g of water, and 800 g of zirconium oxide is dispersed therein, thereby obtaining a coating composition for using as a material for forming a diffusion coating and a hydrophilic coating.

The coating composition is coated, by spraying, on Surface A of one of the two laminated sheets in an amount of 0.3 mg/cm$^2$ in a manner such that the diffusion coating is formed on opposite marginal areas of Surface A each having a width of 125 mm (which marginal areas correspond to the upper and lower portions of the electrolytic cell when the final cation exchange membrane is set in an electrolytic cell), followed by drying of the coating. The resultant membrane is subjected to hydrolysis and cut, to thereby obtain a cation exchange membrane of a size of 1,270 mm×2,455 mm, having a central non-coated area of 1,020 mm ×2,455 mm in size.

Using the other laminated sheet, the formation of the coating on opposite marginal areas is conducted for both Surface A and Surface B, thereby obtaining a membrane having a coating on both surfaces thereof.

The diffusion velocity of sodium hydroxide through the diffusion coating of each membrane is 1,500 meq/dm$^2$·hr, whereas the diffusion velocity of sodium hydroxide through the outer layer on the side of Surface A of the membrane is 30 meq/dm$^2$·hr, which outer layer is to face the cathode in an electrolytic cell. After the hydrolysis, Polymer A and Polymer B have water sorptions of 5% and 10%, respectively.

Each of the thus obtained cation exchange membranes is set in the same filter press-type electrolytic cell as used in Example 1 in a manner such that Surface A of the membrane faces the cathode and the opposite marginal areas having disposed thereon the diffusion coatings are, respectively, positioned in the upper and lower portions of the electrolytic cell. Then, electrolysis is conducted at a temperature of 85 to 90.° C. and at a current density of 15A/dm$^2$ to 40A/dm$^2$ for 360 days while the sodium chloride concentration of the solution in the anode compartment is maintained at 3.5N and the sodium hydroxide concentration of the solution in the cathode compartment is maintained at 33% by weight.

After completion of the electrolysis, the cation exchange membrane is removed and cross sections of the membrane at the marginal area having disposed thereon the diffusion coating, which marginal area has been on the upper portion of the electrolytic cell, is visually examined. Neither the formation of crystals of sodium chloride nor a break in the membrane is observed. Further, the mechanical strengths of the membrane having the diffusion coating disposed on Surface A (cathode side) and the membrane having the diffusion coating disposed on Surface A and the hydrophilic coating disposed on Surface B are measured at the start-up of the electrolysis and after the electrolysis trolysis for 360 days. The results are shown below.

|  |  | Tensile strength (kg/cm) | Tensile elongation (%) |
| --- | --- | --- | --- |
| Membrane having a diffusion coating disposed on Surface A (cathode side) | At start-up | 6.0 | 20 |
|  | After 360 days | 5.0 | 15 |
| Membrane having diffusion coating disposed on Surface A and hydrophilic coating disposed on Surface B | At start-up | 6.0 | 20 |
|  | After 360 days | 5.8 | 18 |

COMPARATIVE EXAMPLE 2

Substantially the same procedure as in Example 3 is repeated except that no coatings are formed on Surface A and Surface B, to thereby obtain a cation exchange membrane. Then, electrolysis is conducted using the membrane in the same manner as in Example 3. After completion of the electrolysis, the membrane is taken out of the electrolytic cell, and several cross sections of the membrane at a portion having positioned at the upper portion of the electrolytic cell are visually observed. Formation of crystals of sodium chloride is observed at that portion. The sodium chloride crystals are washed away, and it is found that at the portion of the membrane where the crystals of sodium chloride have been formed, there is a cavity and the tissue of the membrane is broken. The mechanical strength of the above-mentioned membrane is measured at the start-up of the electrolysis and after the electrolysis for 360 days. The results are shown below.

|  | At start-up | After 360 days |
|---|---|---|
| Tensile strength (kg/cm) | 6.0 | 2.5 |
| Tensile elongation (%) | 20 | 10 |

What is claimed is:

1. A cation exchange membrane for use in electrolysis of an alkali metal chloride, comprising:
    a quadrilateral base membrane comprising a plurality of layers of a cation exchange fluorocarbon polymer and having two surfaces each having four marginal areas respectively extending adjacent to and along four sides of the quadrilateral base membrane, and
    a diffusion coating disposed on only the marginal areas where at least one marginal area of said four marginal areas of one surface of the base membrane is coated,
    wherein said one surface of the base membrane is comprised of a surface of a first outermost layer of the base membrane which layer has a water sorption smaller than that of an opposite, second outermost layer of the base membrane and said diffusion coating permits an alkali metal hydroxide formed by electrolysis of an alkali metal chloride to diffuse therethrough at a diffusion velocity greater than that at which the alkali metal hydroxide diffuses through said first outermost layer,
    said first outermost layer of the base membrane comprising a cation exchange fluorocarbon polymer obtained by copolymerization of at least one monomer selected from fluorinated vinyl compounds and at least one monomer selected from vinyl compounds having a functional group converted into a carboxylic acid type ion exchange group and vinyl compounds having a functional group converted into a sulfonic acid type ion exchange group.

2. The cation exchange membrane according to claim 1, wherein said diffusion coating is disposed on opposite marginal areas of said one surface of the base membrane.

3. The cation exchange membrane according to claim 1, further having a hydrophilic coating comprising inorganic particles, which is disposed on a surface of said opposite, second outermost layer at an area corresponding to said at least one marginal area having the diffusion coating thereon.

4. The cation exchange membrane according to claim 1, wherein said second outermost layer of the base membrane contains carboxylate groups, sulfonate groups or a mixture thereof.

5. The cation exchange membrane according to claim 1, wherein said diffusion coating comprises a fluorocarbon polymer containing carboxylate groups, sulfonate groups or a mixture thereof.

6. The cation exchange membrane according to claim 5, wherein said diffusion coating further comprises inorganic particles.

7. A cation exchange membrane for use in electrolysis of an alkali metal chloride, comprising:
    a quadrilateral base membrane comprising a layer of a cation exchange fluorocarbon polymer and having two surfaces each having four marginal areas respectively extending adjacent to and along four sides of the quadrilateral base membrane, said fluorocarbon polymer comprising a cation exchange fluorocarbon polymer obtained by copolymerization of at least one monomer selected from fluorinated vinyl compounds and at least one monomer selected from vinyl compounds having a functional group converted into a carboxylic acid type ion exchange group and vinyl compounds having a functional group converted into a sulfonic acid type ion exchange group, and
    a diffusion coating disposed on only the marginal areas where at least one marginal area of said four marginal areas of one surface of the base membrane is coated,
    wherein said diffusion coating permits an alkali metal hydroxide formed by electrolysis of an alkali metal chloride to diffuse therethrough at a diffusion velocity greater than that at which the alkali metal hydroxide diffuses through the fluorocarbon polymer layer.

8. The cation exchange membrane according to claim 7, further having a hydrophilic coating comprising inorganic particles, which is disposed on a surface of said opposite, second outermost layer at an area corresponding to said at least one marginal area having the diffusion coating thereon.

9. The cation exchange membrane according to claim 7, wherein said diffusion coating comprises a fluorocarbon polymer containing carboxylate groups, sulfonate groups or a mixture thereof.

10. The cation exchange membrane according to claim 9, wherein said diffusion coating further comprises inorganic particles.

* * * * *